United States Patent
Lowe (10) Patent No.: US 12,425,806 B2
(45) Date of Patent: Sep. 23, 2025

(54) SYSTEMS AND METHODS FOR GENERATING REAL-TIME LOCATION-BASED NOTIFICATIONS

(71) Applicant: Capital One Services, LLC, McLean, VA (US)

(72) Inventor: Kevin M. Lowe, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 299 days.

(21) Appl. No.: 18/045,703

(22) Filed: Oct. 11, 2022

(65) Prior Publication Data

US 2024/0121576 A1   Apr. 11, 2024

(51) Int. Cl.
*H04W 4/029* (2018.01)
*H04W 4/12* (2009.01)

(52) U.S. Cl.
CPC ............. *H04W 4/029* (2018.02); *H04W 4/12* (2013.01)

(58) Field of Classification Search
CPC ................................ H04W 4/12; H04W 4/029
See application file for complete search history.

(56) References Cited

U.S. PATENT DOCUMENTS

2010/0250430 A1* 9/2010 Ariff ............... G06Q 40/00
 705/38
2015/0262132 A1* 9/2015 Miller ........... G06Q 10/063114
 705/7.15

* cited by examiner

*Primary Examiner* — Congvan Tran
(74) *Attorney, Agent, or Firm* — Foley & Lardner LLP (57) ABSTRACT

Systems and methods for generating real-time location-based notifications are described. In some aspects, the system receives a recurring user activity that is recurring at a previous location during a recurring time period. Based on detecting that a current location of the user is in proximity of the previous location during an instance of the recurring time period, the system determines whether any user activity was executed while the user is present at the current location. Based on determining that a current user activity was executed by the user different from the recurring user activity, the system determines whether the current user activity is a substitute for an instance of the recurring user activity. The system updates a measure of elasticity of the recurring user activity based on determining that the current user activity is a substitute for the instance of the recurring user activity.

20 Claims, 7 Drawing Sheets

SYSTEMS AND METHODS FOR GENERATING REAL-TIME LOCATION-BASED NOTIFICATIONS

SUMMARY

Methods and systems are described herein for novel uses and/or improvements to artificial intelligence applications. As one example, methods and systems are described herein for generating real-time location-based notifications related to detecting whether a particular user activity is a substitute for one or more instances of another user activity during a recurring time period.

Existing systems fail to account for elasticity of a user's activities and do not address such elasticity to detect absence of a user activity (e.g., the user activity is inelastic) or identify user activities occurring in lieu of the user activity (e.g., the user activity is elastic). For example, existing systems fail to extrapolate from recurring user activity and possible relations with other user activities. Further, existing systems fail to incorporate real-time location data and combine it with previous user activity to inform their models for detecting whether a particular user activity is a substitute for one or more instances of another user activity during a recurring time period. The difficulty in adapting artificial intelligence models for this practical benefit faces several technical challenges, such as the lack of an infrastructure to incorporate real-time location information into analysis of the user's activities; the lack of techniques to consider elasticity of the user's recurring activities and subsequent matching to current activities; and the pipeline to deliver real-time location-based notifications to a user for the outcome of the analysis of the user's activities.

To overcome these technical deficiencies in adapting artificial intelligence models for this practical benefit, methods and systems disclosed herein generate real-time location-based notifications related to detecting whether a particular user activity is a substitute for one or more instances of another user activity during a recurring time period. For example, the system may process a history of user activities to determine a recurring user activity that is recurring at a corresponding location during a recurring time period (e.g., during 10:00 a.m. to 11:00 a.m. every Wednesday, or another suitable time period). When the system detects that a current location of the user is in proximity of the earlier determined location during an instance of the recurring time period, the system may determine whether any user activity was executed by the user. If a current user activity was executed by the user but is different from the recurring user activity, the system may process the current user activity and the current location using a machine learning model to determine whether the current user activity is a substitute for an instance of the recurring user activity. The system may generate a real-time location-based notification to the user regarding the outcome of the analysis of the user's activities. Accordingly, the methods and systems provide a mechanism for generating insight from the absence of or variations in the user's activities.

In some aspects, the systems and methods described herein include a method comprising: receiving a recurring user activity that is recurring at a previous location during a recurring time period, the previous location being a location where the recurring user activity was executed by a user; in response to detecting that a current location of the user is in proximity of the previous location during an instance of the recurring time period, determining whether any user activity was executed by the user during the instance of the recurring time period while the user is present at the current location; in response to determining that a current user activity was executed by the user and is different from the recurring user activity, processing the current user activity and the current location using a machine learning model to determine whether the current user activity is a substitute for an instance of the recurring user activity; and updating a measure of elasticity of the recurring user activity based on determining that the current user activity is a substitute for the instance of the recurring user activity. In response to determining that no user activity was executed by the user, the method generates a notification to the user indicating no user activity was executed during the instance of the recurring time period.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION

In the following description, for the purposes of explanation, numerous specific details are set forth in order to provide a thorough understanding of the embodiments of the systems and methods described herein. It will be appreciated, however, by those having skill in the art that the embodiments may be practiced without these specific details or with an equivalent arrangement. In other cases, well-known structures and devices are shown in block diagram form in order to avoid unnecessarily obscuring the embodiments.

Figure 1:
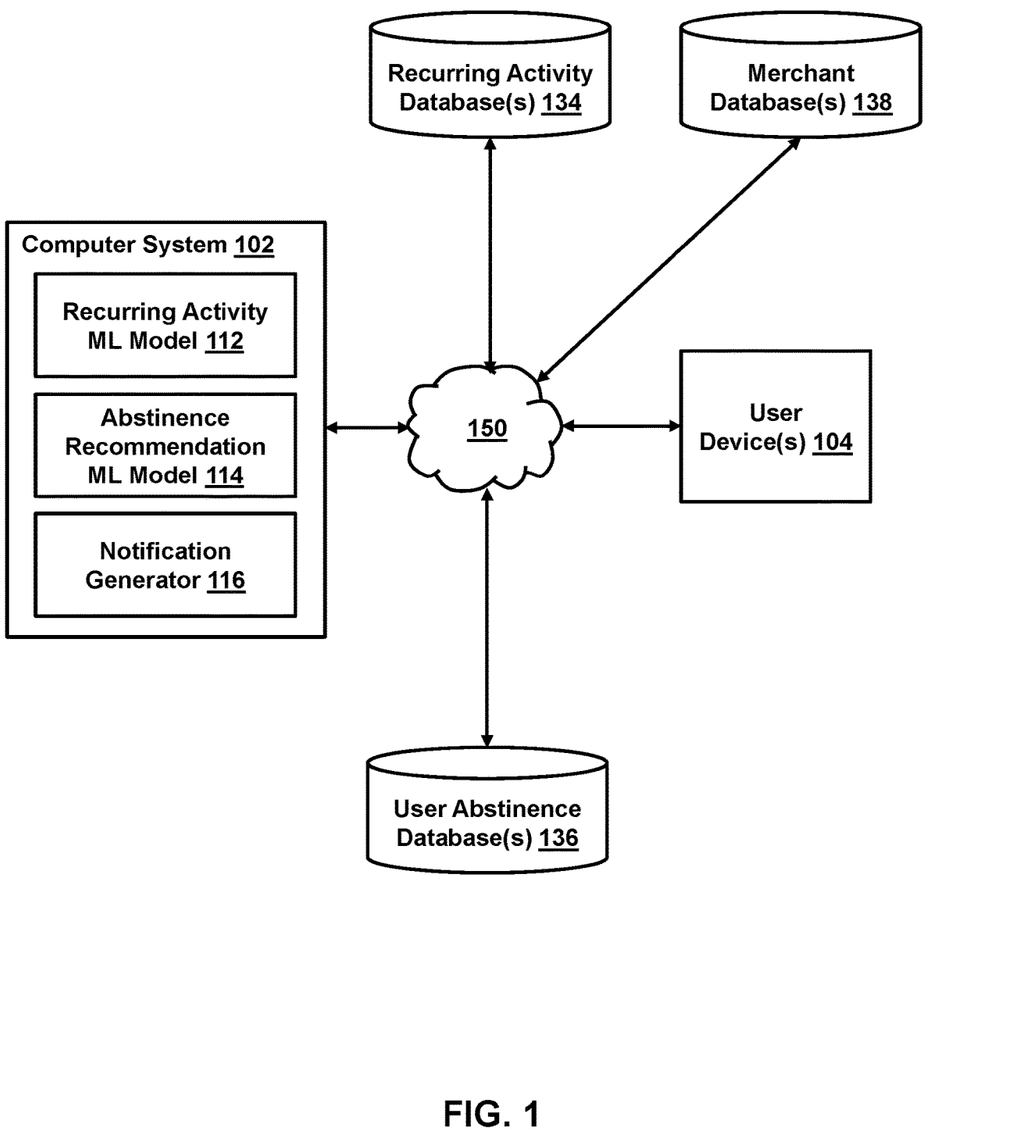
FIG. 1 shows an illustrative diagram for identifying recurring activities and recommending and recording user abstinence programs, in accordance with one or more embodiments.

FIG. 1 shows an illustrative diagram for a system which combines data for locations and activities and utilizes a machine learning model to generate recommendations, in accordance with one or more embodiments. System 150 may contain computer system 102, comprising: recurring activity machine learning model 112, abstinence recommendation machine learning model 114, and notification generator 116; recurring activity database(s) 134; user abstinence database(s) 136; and may access user device(s) 104.

The system may receive data about a user's activity, which may be stored as unprocessed data in recurring activity database(s) 134. The system may communicate with a user device using one or more components described in FIG. 3 below to receive information regarding user activity. Such information may include, but is not limited to, the activity the user engaged in, the location of the activity, the type or category of the activity, the time at which the user engaged in the activity, an estimate for the elasticity of the activity if it is recurring, and any associated metadata. The system may, for example, receive data from a payment terminal that a credit card transaction has been posted to the account of a user at a particular store (e.g., a McDonald's location). The system may determine that the user engaged in transactional activity at the location of the store.

The system may use real-time location or transaction data of the user in conjunction with a location database (e.g., Merchant Database(s) 138) to identify the provider of an activity. For example, Merchant Database(s) 138 may list one or more McDonald's franchises, and when the user visits on of the franchises, the system may use Merchant Database(s) 138 to determine the type of activity the user engaged in. Merchant Database(s) 138 may include a list of merchants, their locations, the types of goods or services they provide, and associated metadata like the elasticities of activities provided by each merchant.

The system may additionally acknowledge the contents of the purchase, and may note the time, in addition to any relevant metadata. For example, the system may record in recurring activity database(s) 134 that on Thursday, Aug. 25, 2022, at 10:15 a.m., a user purchased food and drink at a particular location of McDonald's. In some embodiments, the system may communicate with one or more mobile applications on a user device, which may have GPS tracking enabled. The system may receive data from these applications regarding activities the user engages in. The system may also access the user's real-time location through these applications.

Recurring activity database(s) 134 may record, in association with a particular recurring activity, the elasticity measure of the recurring activity. The activity may be considered inelastic if no substitute activity is detected as being performed by the user in lieu of the activity. The activity may be considered elastic if a substitute activity is detected as being performed by the user during an instance of a recurring time period for the activity. This measure of elasticity captures the ease or difficulty with which the user abstains from or seeks alternatives to the recurring activity. Elasticities may be applied to activities of different scope. For example, the system may determine an elasticity of a user regarding their coffee consumption, or regarding their recurring purchases of Starbucks each Sunday. Elasticities for activities of the same category may differ based on the locations and/or providers of such activities. For example, a user may have high elasticity for Dunkin' Donuts coffee but low elasticity for Starbucks. A higher elasticity indicates the user can replace or forego the recurring activity with relative ease. When the user engages in the recurring activity, or chooses not to, within a recurring time period, the system may adjust the measure of elasticity using one or more mathematical formulas. For example, a method of calculating elasticity for a particular recurring activity could be a fraction with the denominator being the number of recorded recurring time periods that pertain to the user's recurring activity, and the numerator being the number of such recurring time periods in which the user did not engage in the recurring activity.

The system may process the history of a user's activities in recurring activity database(s) 134 using a first machine learning model (e.g., recurring activity machine learning model 112). Recurring activity machine learning model 112 may perform clustering and/or classification on user activity data to identify patterns in user activities. Such patterns of recurring activities may constitute a habit; for example, a user might eat breakfast from McDonald's every morning. System 150 may form feature vectors for each user activity, using the description of the activity, its location, its frequency of occurrence, and any metadata. Recurring activity machine learning model 112 might use neural networks or other appropriate methods to perform unsupervised clustering to identify if a history of a user's activities includes a recurring activity. Recurring activity machine learning model 112 may additionally reference the user activity data of other users to train the neural network for accuracy in identifying recurring activities. Recurring activity machine learning model 112 may identify one or more activities from the one pattern of recurrence with differing degrees of granularity. For example, Recurring activity machine learning model 112 may output a recurring activity of coffee and a recurring activity of Starbucks coffee from a user's habitual consumption of Starbucks coffee.

In some embodiments, the system may communicate with user device(s) 104 to obtain an indication of user willingness to participate in a program of abstinence, as will be detailed in FIGS. 2A-2D below. The system may, based on the measure of elasticity of the recurring user activity, the current user activity, and/or user abstinence from the recurring user activity, identify one or more programs of abstinence relevant to the user. It may use abstinence recommendation machine learning model 114 to produce recommendations for the programs of abstinence. Abstinence recommendation machine learning model 114 may be trained on data for past recurring activities of the user, the past abstinence programs of other users, and any other source of relevant data. Such data may be obtained in recurring activity database(s) 134 and user abstinence database(s) 136. Abstinence recommendation machine learning model 114 may take as input a feature vector combined from the history of the recurring user activity, the estimate for the elasticity of the recurring activity, and a guidance extent of the abstinence received from the user. Abstinence recommendation machine learning model 114 may use one or more machine learning algorithms like unsupervised classification and/or multivariate regression. Abstinence recommendation machine learning model 114 may output a recommendation for one or more programs of abstinence for a recurring activity. The recurring activity may range in specificity (e.g., the recurring activity may be coffee consumption or Starbucks purchases).

When the user selects a program of abstinence, the system may generate a record of instances of abstinence in user abstinence database(s) 136. The record may include expectations for recurring time periods, as may be received from the user within a user interface like FIGS. 2A-2D. For example, the user may indicate their willingness to cut back on Starbucks consumption every Sunday morning. The record may create an instance of abstinence every Sunday morning, and record the extent of the user's abstinence, or lack thereof. Whenever an entrance is made in the record, the measure of elasticity for the recurring activity within recurring activity database(s) 134 may be updated. In addition, the system may occasionally or periodically aggregate the record within user abstinence database(s) 136 to generate a report of progress that the user has made in the program of abstinence. For example, the system may commemorate $500 that the user saved in the name of some cause to which they dedicated the abstinence program. The system may send the user a notification to that effect within a mobile application, as exemplified in FIGS. 2A-2D.

Figure 2A:
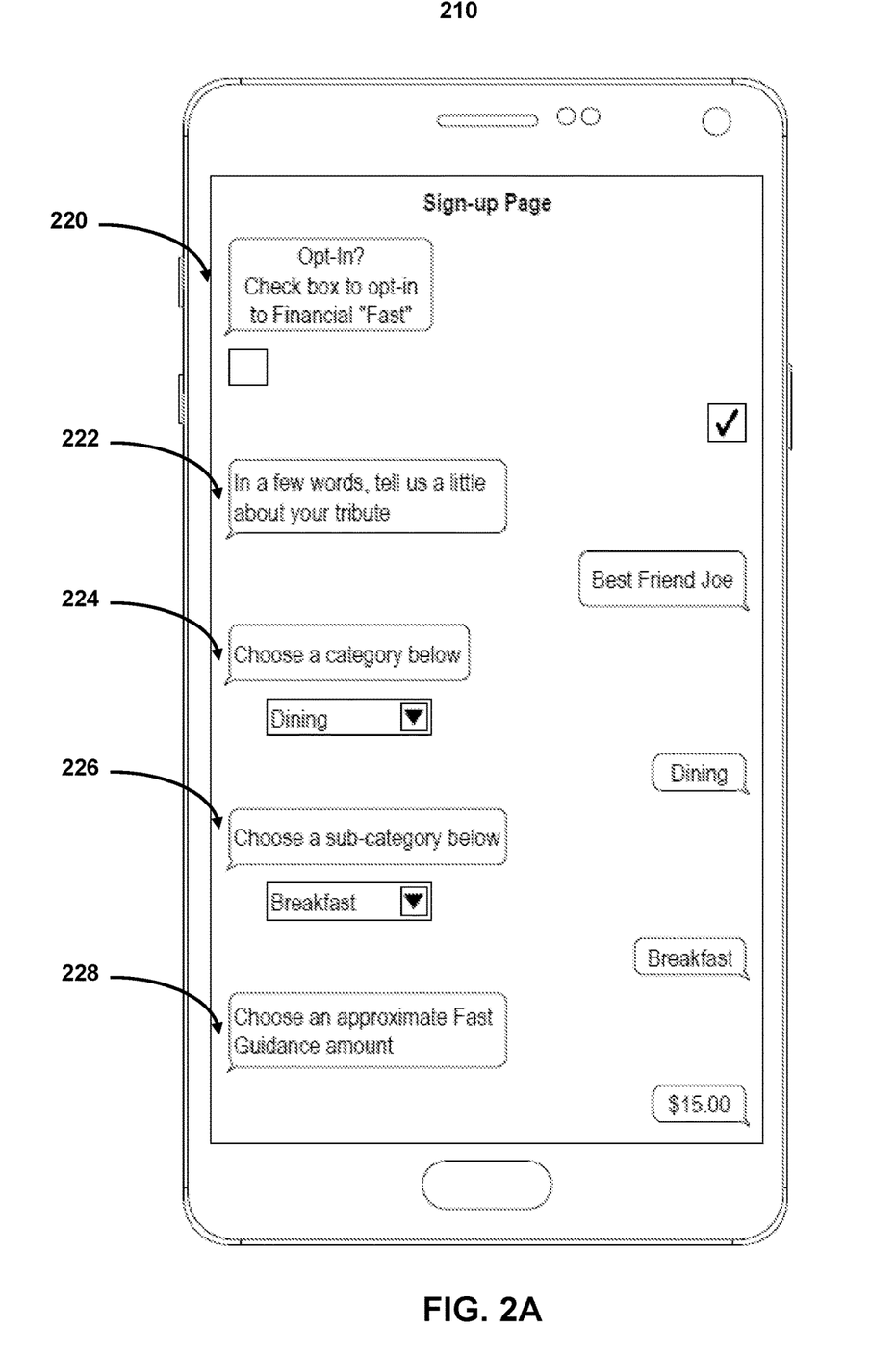
FIGS. 2A-2D shows an illustrative user interface for communicating with the user about their participation in abstinence programs, in accordance with one or more embodiments.
Figure 2B:
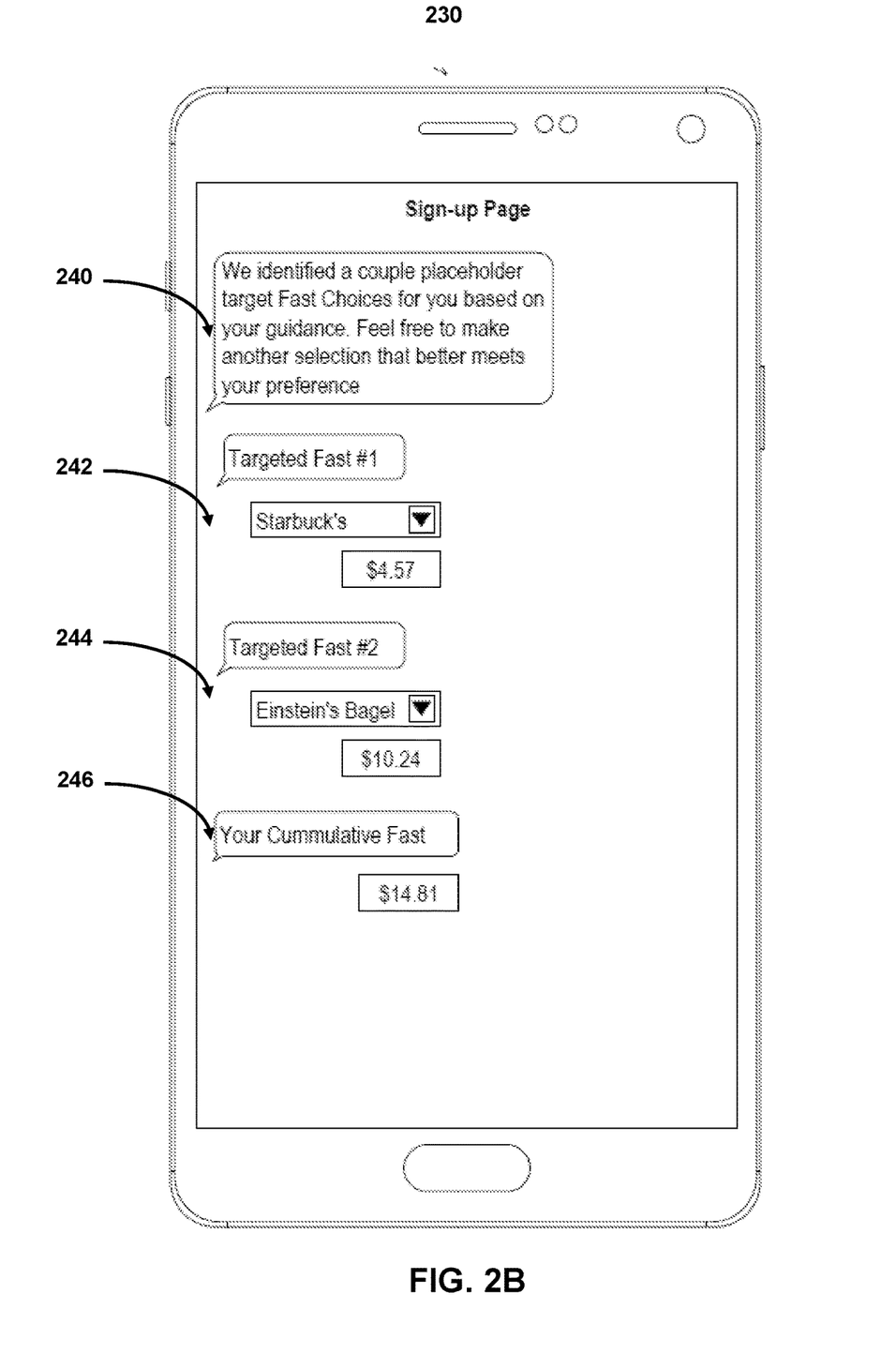
Figure 2C:
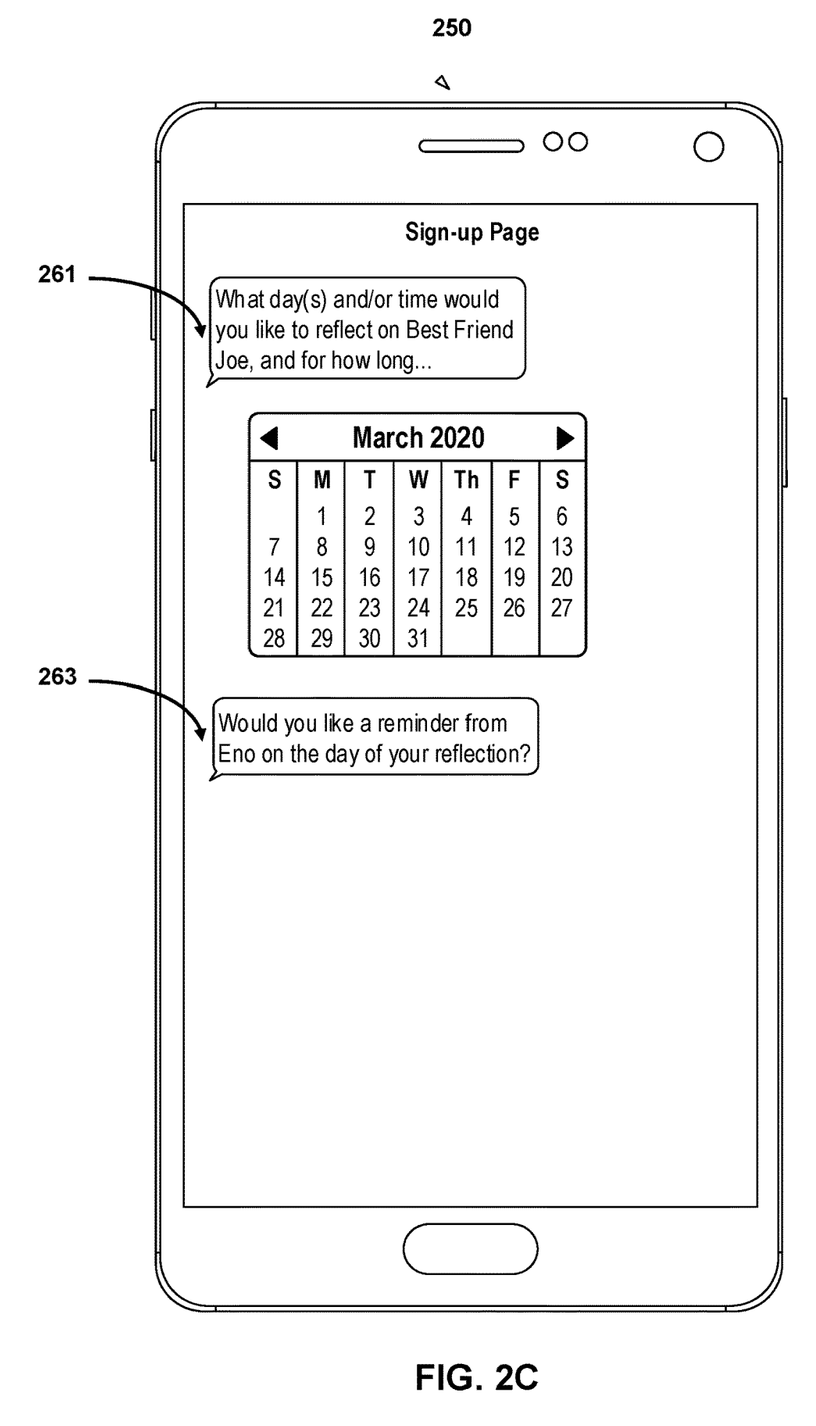

The system may use notification generator 116 to communicate with user device(s) 104 for various purposes. Notification generator 116 may send a push notification to user devices or initiate a conversational exchange in a mobile application. Notification generator 116 may prompt the user to sign up for a program of abstinence and provide specific guidance as to the extent of abstinence, the purpose of the abstinence program and the frequency of recurrence. Such a conversational exchange within a mobile application is shown in FIG. 2A and FIG. 2C. Notification generator 116 may also display system recommendations to the user for targets of abstinence and approximate extents, as shown in FIG. 2B. Notification generator 116 may, at the start of each recurring time period, remind the user that a recurring time period is coming up and encourage them to abstain from the recurring activity. At the end of a recurring time period, if the system has detected a successful instance of abstinence, notification generator 116 may send a notification to congratulate the user as a positive reinforcement stimulus. When the record of abstinence within user abstinence database(s) 136 indicates some significant progress in the abstinence program, notification generator 116 may send a progress report to a user device. For example, if the user has successfully met goals for every instance of abstinence in a month, notification generator 116 may praise their consistency.

FIGS. 2A-2D shows illustrative user interfaces 210, 230, 250, and 270 for receiving indication of a user's willingness to participate in a program of abstinence and recommending to the user abstinence targets. The system may suggest to the user, in the context of a conversational interaction in a mobile application on a user device, opting into a financial abstinence program. For example, the system may use text prompt 220 to suggest the user opt into a financial abstinence program. This may prompt the user to consider what important objectives they might dedicate a fast to, and prepare the user for the collection of their activity data for analysis. When the user ticks a box in the mobile application, the system may enroll them in a program of abstinence. When the system receives indication of the user being enrolled in a program of abstinence, the system may generate a record of instances where the user abstained from their usual activity.

The system may use text prompt 222 to allow the user to input a free-form text label for the attribution of this particular financial abstinence program. For example, the user may dedicate a fast to their best friend Joe. The system may record the free-form text label and associate it with the financial abstinence program in user abstinence database(s) 136.

The system may ask the user to define some parameters of the fast by text prompts 224, 226, and 228. Text prompt 224 may be a drop-down menu for the user to select a broad category of abstinence, and text prompt 226 may be a drop-down menu to further specify a sub-category of abstinence. For example, the user may specify that the abstinence is in the category of dining; specifically it is in the sub-category of breakfast. Text prompt 228 may cause the user to suggest an approximate guidance amount for the extent of each abstinence. For example, the user may decide that $15 for each instance of abstinence would be reasonable. The user may input this information in a text field.

The system may use abstinence recommendation machine learning model 114 in combination with metadata around the recurring user activity including elasticity measures and a history of the user's activity to identify one or more programs of abstinence relevant to the user. The outputs of abstinence recommendation machine learning model 114 may be communicated through a server to a mobile application on a user device in an interface like interface 230. The recommendations of the system may be sent to the user device as a real-time push notification or a text prompt. For example, a text prompt like 240 may inform the user that the system has made recommendations and that the recommendations are just for guidance. The user is free to enroll in some other program of abstinence, or define their own. Text prompt 242 may include a target program of abstinence with a brief description of the location and/or type of activity the user may abstain from. For example, it may prescribe that the user financially abstains from consuming Starbucks. Text prompts like 242 in this user interface may also include an amount which guides the user to approximately how much they should cut back on an item or type of activity. Text prompt 244 may be complementary or similar to text prompt 242. It may also suggest a specific merchant or provider of an activity the user regularly engages in, and provide a numerical guideline on how much the user should abstain by. Text prompt 246 may display the aggregate effects of the guideline abstinence program and may show a dollar amount to capture the suggested degree of abstinence.

Text prompts 261 allows the user to dynamically adjust the timing and frequency of their abstinence program. For example, the user may indicate to the system that every Thursday they will skip lunch in honor of a friend struggling with diabetes. The system may thus determine a recurring time period of every Thursday around noon, and if no dining activity is detected within such a period, an instance of abstinence is recorded in, for example, user abstinence database(s) 136. Also, the express knowledge of an upcoming recurring time period for abstinence which the user set up allows the system to easily determine when to send the user an encouraging text prompt like text prompt 281. Text prompt 263 may allow the user to sign up for regular reminder notifications from the system. For example, the user may elect to receive a push notification on their mobile device or within a mobile application each recurring time period, which reminds them to stick to their abstinence program.

Figure 2D:
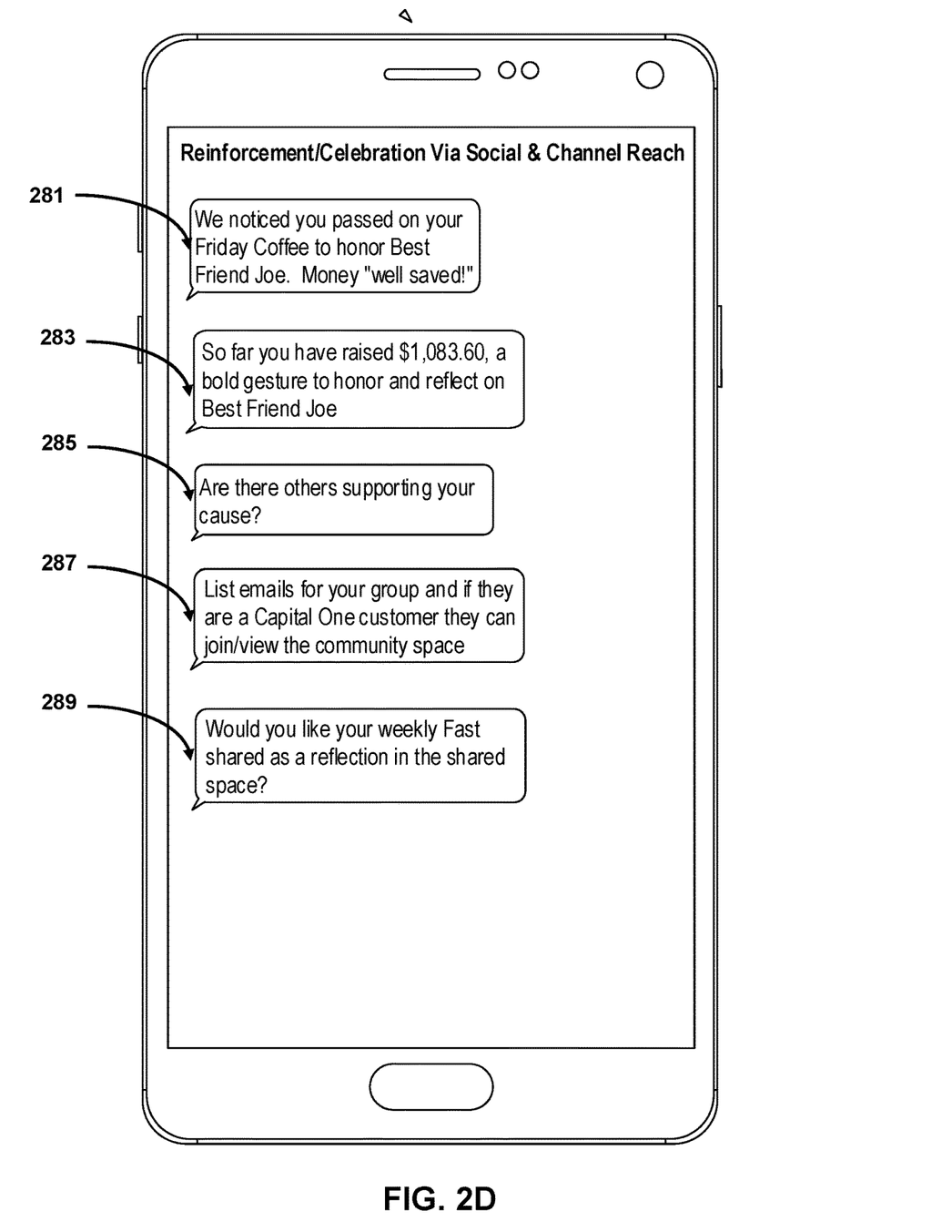

User interface 270 shows a progress report which may be presented to the user at regular time intervals or at the prescribed end of an abstinence program. Text prompt 281 illustrates a notification the system may send to a user device after a recurring time period of a recurring activity. For example, notifications including and similar to text prompt 281 may be sent after the system detects that no activity has been executed in the recurring time period. In addition to recording the instance of abstinence, the system may use such notifications to send words of affirmation and encouragement to the user to reinforce their willingness to keep participating in the program of abstinence. Such notifications may also be sent to the user device at the beginning of a recurring time period to remind them of the dedication they made for the program of abstinence, which may be captured in the user's response to text prompt 222. Notifications as exemplified by text prompt 281 may encourage the user to adhere to the program of abstinence.

Text prompt 283 exemplifies a report of progress in a notification to the user device. For example, the notification may commemorate the user saving a certain amount in an abstinence program; the notification may remind the user of the free-form tribute that they provided. Text prompt 283 may, in addition to showing aggregate progress the user has made, show their strict adherence to the commitment they made. For example, it may display that the user has not missed an instance of abstinence ever. Text prompts 285, 287, and 289 provide outlets for the user to share their experience with the program of abstinence and progress they have made with their social network. The system may provide shortcuts to social media platforms or banking and/or credit card applications where the user may broadcast their progress reports.

Figure 3:
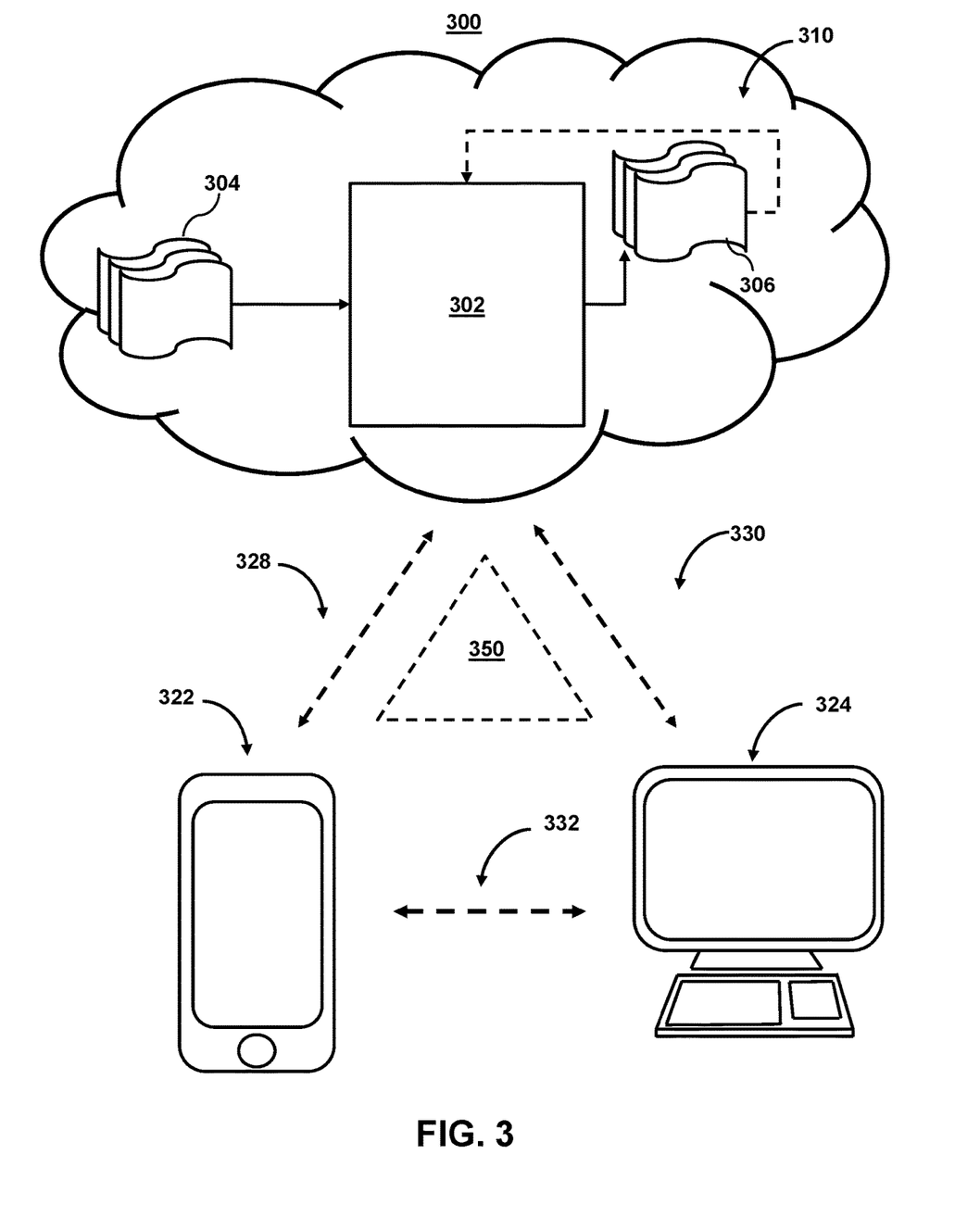
FIG. 3 shows illustrative components for a system used to identify recurring activities and recommend and record user abstinence program, in accordance with one or more embodiments.

FIG. 3 shows illustrative components for a system used to identify recurring activities and instances of abstinence, in accordance with one or more embodiments. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device, such as a computer screen, and/or a dedicated input device, such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include recurring activity machine learning model 112, abstinence recommendation machine learning model 114, notification generator 116, recurring activity database(s) 134, and user abstinence database(s) 136.

Cloud components 310 may include model 302, which may be a machine learning model, artificial intelligence model, etc. (which may be referred to collectively herein as "models"). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction. For example, the model may indicate whether an activity should be considered a recurring activity.

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., whether an activity should be considered a recurring activity).

In some embodiments, the model (e.g., model 302) may automatically perform actions based on outputs 306. In some embodiments, the model (e.g., model 302) may not perform any actions. The output of the model (e.g., model 302) may be used to determine whether an activity should be considered a recurring activity.

System 300 also includes API layer 350. API layer 350 may allow the system to generate summaries across different devices. In some embodiments, API layer 350 may be implemented on mobile device 322 or user terminal 324. Alternatively, or additionally, API layer 350 may reside on one or more of cloud components 310. API layer 350 (which may be a REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API platforms and their modules. API layer 350 may use a developer portal. API layer 350 may use strong security constraints applying WAF and DDoS protection, and API layer 350 may use RESTful APIs as standard for external integration.

Figure 4:
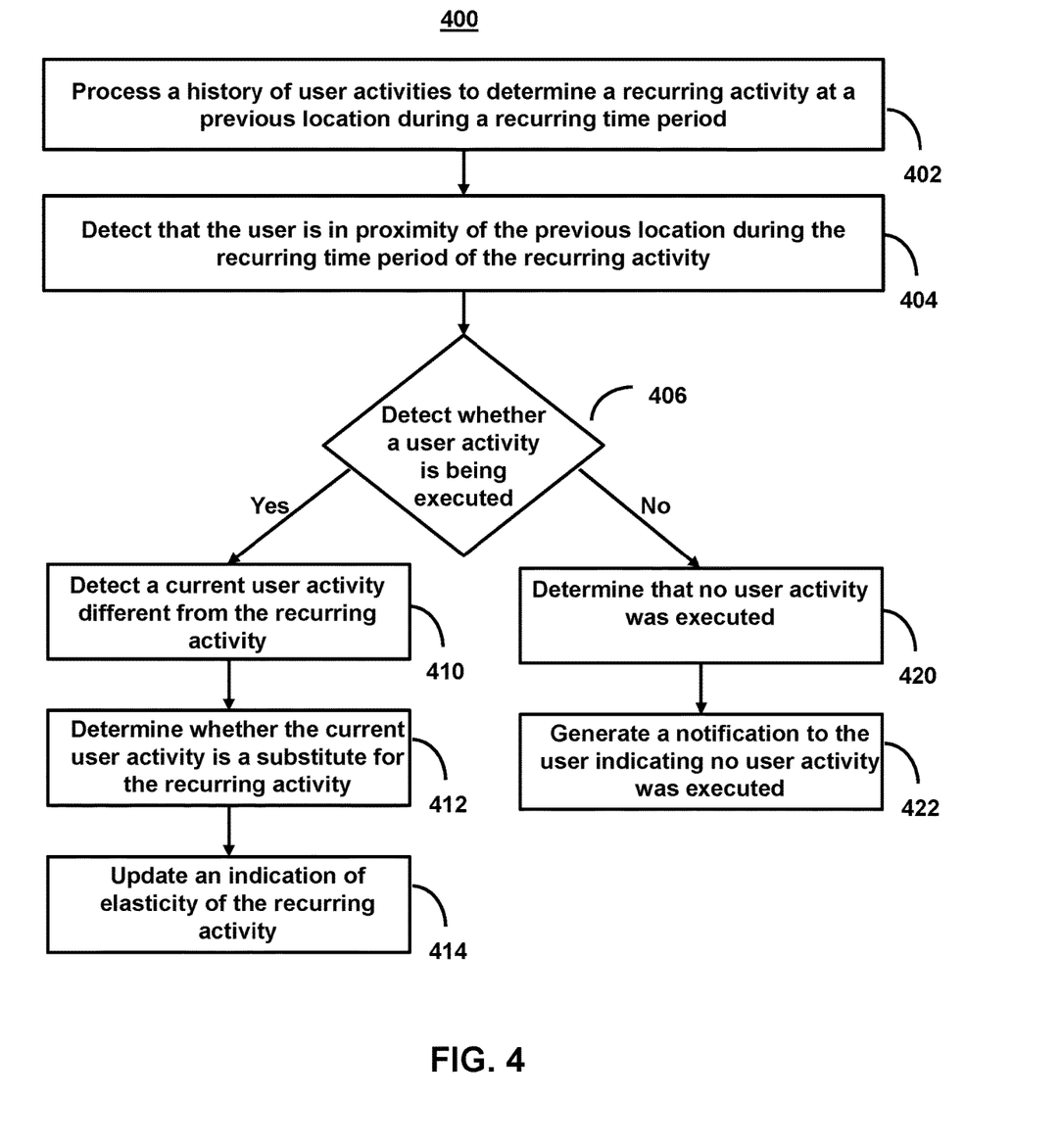
FIG. 4 shows a flowchart of the steps involved in detecting whether a particular user activity is a substitute for one or more instances of another user activity during a recurring time period, in accordance with one or more embodiments.

FIG. 4 shows a flowchart of the steps involved in determining whether an activity was performed in proximity to a recurring activity and whether it is a substitute for that activity, in accordance with one or more embodiments. For example, the system may use process 400 (e.g., as implemented on one or more system components described above) in order to generate insight from the absence of or irregularities in user activity data.

At step 402, process 400 (e.g., using one or more components described above) may process a history of user activities to determine a recurring activity at a previous location during a recurring time period. For example, the system may process, using a machine learning model, a history of user activities, to determine a recurring user activity that is recurring at a previous location during a recurring time period. The previous location may be defined as a location where the recurring user activity was executed by a user. The first machine learning model may be the recurring activity machine learning model described in FIG. 1, and it may access data including a history of user activities within the recurring activity database(s) 134. The system may obtain information about the location and time of the recurring activity by communicating with user device(s)

104. By doing so, the system may identify patterns in the user's activities, variations from which may be suitable for analysis.

At step 404, process 400 (e.g., using one or more components described above) may detect that the user is in proximity of the previous location during the recurring time period of the recurring activity. In some embodiments, the system may calculate the distance between the user's real-time location and the previous location of the recurring activity. If the distance is less than a set threshold, the system may determine the user is in proximity of the previous location. For example, the system may have determined a recurring activity for a user to be visiting Starbucks each Sunday morning. This recurring activity may be stored in recurring activity database(s) 134. The system may detect that the user is near the Starbucks location on a Sunday morning by communicating with user device(s) 104, which could indicate the real-time GPS location of the user.

At step 406, process 400 (e.g., using one or more components described above) may detect whether a user activity is being executed. The system may do this by, for example, receiving indication of transactions from payment terminals at the location of the recurring activity or from the user's device(s) and/or transactional histories. For example, the recurring time period of the above recurring activity may be each Sunday from 9:00 a.m. to 10:00 a.m. in the user's time zone. The system may have access to transactional applications on the user's device (e.g., credit card applications) or to networks of service providers (e.g., Visa®, Mastercard®, etc.) which allow the system to receive indication that a purchase has been made at the Starbucks location between 9:00 a.m. to 10:00 a.m. in the user's time zone. If the user purchases food and drink at a Dunkin' Donuts location nearby, the system may detect a user activity being executed which is different from the recurring activity. In some embodiments, the system may note that a activity of coffee consumption has been executed by the user, but that the activity is not the recurring Starbucks purchase.

Otherwise, if the user was simply near the location of a Starbucks in their usual Sunday morning period, the system may detect no account activity between 9:00 a.m. to 10:00 a.m. After the time period of the recurring activity, for example at 10:01 a.m., the system may determine that no user activity was executed. Whether the system determines a user activity has been executed may inform the system of the relative importance of the recurring user activity and may lead the system to adjust a measure of elasticity for the recurring activity. For example, if the user chose to visit Dunkin' Donuts instead of Starbucks, that speaks to the replaceability of Starbucks as an activity of the user. The continuing coffee consumption may be noted by the system as user inelasticity regarding type of activity, but elasticity regarding merchant.

Conversely, if the user continued their Starbucks activity, that is one additional piece of evidence for the inelasticity of the activity on both dimensions of type and merchant. The system may capture these indications of relative replaceability of the recurring activity as a measure of elasticity.

At step 410, process 400 (e.g., using one or more components described above) may detect a current user activity which is different from the recurring activity. This is one of two mutually exclusive scenarios leading from step 406. The system may form a feature vector of the current user activity including a description of the activity, its location, its frequency of occurrence, and any metadata The system may process this feature vector using a classification algorithm of recurring activity machine learning model 112 to determine whether the current user activity is different from the recurring activity. For example, a purchase of $3 less than a user's usual order on every Sunday morning may not cause the current user activity to be classified as different. In this case, it may simply be entered into recurring activity database(s) 134 as another instance of the recurring activity. However, if the user activity changes from purchasing a drink at Starbucks every Sunday morning to purchasing Dunkin' Donuts during a particular Sunday morning, the system may classify this user activity as different from the recurring activity. In some embodiments, the system may note the instance as different from the Starbucks recurring activity despite being an instance of coffee consumption. By doing so, the system may accurately label the user's deviation from the recurring activity, or lack thereof.

At step 412, process 400 (e.g., using one or more components described above) may determine whether the current user activity is a substitute for the recurring activity. For example, the system may use a clustering algorithm to identify activities with a score within a threshold of scores associated with the recurring user activity and determine whether the current user activity is included in the identified activities. In some embodiments, the system may represent the recurring activity in a feature space which may be learned by recurring activity machine learning model 112. The feature space may include a number of real-valued dimensions for representing user activities. A recurring activity and the current user activity may each be represented in this feature space as a real-valued vector. A distance metric may be calculated between the real-valued vector representations of the two activities, using one or more mathematical metrics (e.g., Euclidean distance, Manhattan distance, etc.). The distance metric may be compared against a preset threshold value to determine whether the current user activity is a substitute for the recurring user activity.

At step 414, process 400 (e.g., using one or more components described above) may update a measure of elasticity of the recurring activity. When the system determines that a different activity was executed in the recurring time period from the recurring activity, it may update a measure of elasticity of the recurring activity. The activity may be considered inelastic if no substitute activity is detected as being performed by the user in lieu of the activity. The activity may be considered elastic if a substitute activity is detected as being performed by the user during an instance of a recurring time period for the activity. The substitute activity being performed may be indicative of the relative ease with which the user may replace the recurring activity. Therefore, the system may adjust upwards a measure of elasticity calculated for the recurring activity. For example, the measure of elasticity of the recurring activity may be mathematically expressed as the fraction of substitute activity instances among all recorded instances of the recurring time period where the user either executed an activity or no activity. The system may, in some embodiments, use a more complex mathematical expression to capture the elasticity of the recurring activity. The system may store the measure of elasticity of each recurring activity in recurring activity database(s) 134.

In some embodiments, the system may, based on the measure of elasticity of the recurring user activity, the current user activity, and/or user abstinence from the recurring user activity, identify one or more programs of abstinence relevant to the user and generate for the user a notification suggesting the one or more programs of abstinence. The system may use abstinence recommendation machine learning model 114 in combination with elasticity data from recurring activity database(s) 134 and any relevant data to determine a program of abstinence suitable for the user upon receiving indication of user willingness to participate in the program of abstinence from a user interface like FIG. 2A. The system may refer to the elasticity data for the recurring activity of the user and activities of the same type as the recurring activity for multiple users.

Upon receiving an indication of the user being enrolled in a program of abstinence from the recurring activity, the system may generate a record of instances where the user abstained from the recurring user activity. This record may be stored in user abstinence database(s) 136 and may contain fields such as the recurring time period for abstinence, the extent of each instance of abstinence, and the specific type of activity or merchant location regarding the activity abstained from.

Periodically, the system may aggregate the record of instances where the user abstained into a reporting dataset and generate a report indicating a progress of the user in the program of abstinence based on the reporting dataset for the user. Such a report is exemplified by FIG. 2D. The system may generate a notification to the user for sharing the report, for example, through a mobile application. An example can be found in FIG. 2D, especially in text prompts 282, 284, and 286.

At step 420, process 400 (e.g., using one or more components described above) may determine that no user activity was executed. This is one of two mutually exclusive scenarios— the other being step 410—leading from step 406. For example, the system may receive no indication of user activity in the time period of the recurring activity. This would be noteworthy, particularly if it relates to an abstinence program the user is known to be taking part in. For example, if the user has indicated a willingness to not consume Starbucks in honor of unionized workers, their choice to not purchase the usual Sunday morning Starbucks may be recorded in abstinence database(s) 136. Alternatively, if the system received only user activity which was determined to not be a substitute for the recurring activity, the system may proceed as though no user activity was executed. For example, in the period of time on Sunday morning when the user traditionally would visit Starbucks, the user may purchase a golf club. This activity may be completely unrelated to any abstinence program and may not be a substitute to the user's recurring activity. The system may therefore overlook this user activity and proceed as though no activity was executed in the time period.

When the system determines that no activity was executed in the recurring time period, it may update a measure of elasticity of the recurring activity. The lack of a substitute activity being performed is indicative of the relative importance of the recurring activity. It informs the system of the difficulty in replacing said recurring activity. For example, if the user abstains from coffee altogether, that may imply difficulty of the user in replacing their Starbucks recurring activity due to inflexibility around merchant choice. Consequently, the system may adjust downwards a measure of elasticity calculated for the recurring activity (e.g., the Starbucks consumption).

Additionally, or alternatively, the system may record the instance where no activity was executed in the recurring time period in an abstinence database like user abstinence database(s) 136 from FIG. 1 if the user is known to be participating in an abstinence program. Thus, the system may generate a record of instances where the user abstained from the recurring user activity.

At step 422, process 400 (e.g., using one or more components described above) may generate a notification to the user indicating that no user activity was executed. This notification may serve to encourage the user for successfully completing an instance of abstinence, and to reinforce their commitment to the program of abstinence. An example is given in FIG. 2C in text prompt 260. In addition, if the system determines a milestone is reached within the program of abstinence or that the elasticity of the recurring activity is sufficiently low, it may send a report of progress in a notification to the user device. For example, the notification may commemorate the user saving $1,000 in pursuit of a certain goal. Such a notification is exemplified by text prompt 280 in FIG. 2D.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real-time. It should also be noted that the systems and/or methods described above may be applied to, or used in accordance with, other systems and/or methods.

The present techniques will be better understood with reference to the following enumerated embodiments:

1. A system for generating real-time location-based notifications in a mobile application, comprising: one or more non-transitory, computer-readable medium comprising instructions that, when executed by the one or more processors, cause operations comprising: processing, using a first machine learning model, a history of user activities, to determine a recurring user activity that is recurring at a previous location during a recurring time period, the previous location being a location where the recurring user activity was executed by a user; in response to detecting that a current location of the user is in proximity of the previous location during an instance of the recurring time period, determining whether any user activity was executed by the user during the instance of the recurring time period while the user is present at the current location; in response to determining that a current user activity was executed by the user and is different from the recurring user activity, processing the current user activity and the current location using a second machine learning model to determine whether the current user activity is a substitute for an instance of the recurring user activity; updating a measure of elasticity of the recurring user activity based on determining that the current user activity is a substitute for the instance of the recurring user activity; and in response to determining that no user activity was executed by the user, generating a notification to the user indicating no user activity was executed during the instance of the recurring time period.
2. A method comprising: receiving a recurring user activity that is recurring at a previous location during a recurring time period, the previous location being a location where the recurring user activity was executed by a user; in response to detecting that a current location of the user is in proximity of the previous location during an instance of the recurring time period, determining whether any user activity was executed by the user during the instance of the recurring time period while the user is present at the current location; in response to determining that a current user activity was executed by the user and is different from the recurring user activity, processing the current user activity and the current location using a second machine learning model to determine whether the current user activity is a substitute for an instance of the recurring user activity; updating a measure of elasticity of the recurring user activity based on determining that the current user activity is a substitute for the instance of the recurring user activity.
3. A method comprising: receiving a recurring user activity that is recurring at a previous location during a recurring time period, the previous location being a location where the recurring user activity was executed by a user; in response to detecting that a current location of the user is in proximity of the previous location during an instance of the recurring time period, determining whether any user activity was executed by the user during the instance of the recurring time period while the user is present at the current location; and in response to determining that no user activity was executed by the user, generating a notification to the user indicating no user activity was executed during the instance of the recurring time period.
4. The method of any one of the preceding embodiments, further comprising: processing, using another machine learning model, a history of user activities, to determine the recurring user activity.
5. The method of any one of the preceding embodiments, further comprising: in response to determining that no user activity was executed by the user, generating a notification to the user indicating no user activity was executed during the instance of the recurring time period.
6. The method of any one of the preceding embodiments, wherein using the machine learning model to determine whether the current user activity is a substitute for an instance of the recurring user activity comprises: using a clustering algorithm to identify activities with a score within a threshold of scores associated with the recurring user activity; and determining whether the current user activity is included in the identified activities.
7. The method of any one of the preceding embodiments, further comprising: updating the machine learning model based on the measure of elasticity of the recurring user activity, the current user activity, and/or user abstinence from the recurring user activity.
8. The method of any one of the preceding embodiments, further comprising: based on the measure of elasticity of the recurring user activity, the current user activity, and/or user abstinence from the recurring user activity, identifying one or more programs of abstinence relevant to the user; and generating for the user a notification suggesting the one or more programs of abstinence.
9. The method of any one of the preceding embodiments, further comprising: receiving an indication of the user being enrolled in a program of abstinence from the recurring activity; generating a record of instances where the user abstained from the recurring user activity; and generating for the user real-time notifications during the recurring time period regarding the program of abstinence.
10. The method of any one of the preceding embodiments, further comprising: aggregating the record of instances where the user abstained into a reporting dataset; generating a report indicating a progress of the user in the program of abstinence based on the reporting dataset for the user; and generating a notification to the user for sharing the report.
11. A tangible, non-transitory, machine-readable medium storing instructions that, when executed by a data processing apparatus, cause the data processing apparatus to perform operations comprising those of any of embodiments 1-10.
12. A system comprising one or more processors and memory storing instructions that, when executed by the processors, cause the processors to effectuate operations comprising those of any of embodiments 1-10.
13. A system comprising means for performing any of embodiments 1-10.

What is claimed is:

1. A system for generating real-time location-based notifications in a mobile application comprising:
one or more processors; and
a non-transitory, computer-readable medium comprising instructions that, when executed by the one or more processors, cause operations comprising:
processing, using a first machine learning model, a history of user activities, to determine a recurring user activity that is recurring at a previous location during a recurring time period, the previous location being a location where the recurring user activity was executed by a user;
in response to detecting that a current location of the user is in proximity of the previous location during an instance of the recurring time period, determining whether any user activity was executed by the user during the instance of the recurring time period while the user is present at the current location;
in response to determining that a current user activity was executed by the user and is different from the recurring user activity, processing the current user activity and the current location using a second machine learning model to determine whether the current user activity is a substitute for an instance of the recurring user activity;
updating a measure of elasticity of the recurring user activity based on determining that the current user activity is a substitute for the instance of the recurring user activity;
based on the measure of elasticity of the recurring user activity, identifying one or more programs of abstinence relevant to the user; and
generating, for the user, a notification suggesting the one or more programs of abstinence.

2. The system of claim 1, wherein the instructions, when executed by the one or more processors, further cause operations comprising:

in response to determining that no user activity was executed by the user, generating a notification to the user indicating no user activity was executed during the instance of the recurring time period.

3. The system of claim 1, wherein using the second machine learning model to determine whether the current user activity is a substitute for an instance of the recurring user activity comprises:
using a clustering algorithm to identify activities with a score within a threshold of scores associated with the recurring user activity; and
determining whether the current user activity is included in the identified activities.

4. The system of claim 1, wherein the instructions, when executed by the one or more processors, further cause operations comprising:
updating the second machine learning model based on the measure of elasticity of the recurring user activity, the current user activity, and/or user abstinence from the recurring user activity.

5. The system of claim 1, wherein the instructions, when executed by the one or more processors, further cause operations comprising:
receiving an indication of the user being enrolled in a program of abstinence from the recurring user activity;
generating a record of instances where the user abstained from the recurring user activity; and
generating real-time notifications to the user during the recurring time period regarding the program of abstinence.

6. The system of claim 5, wherein the instructions, when executed by the one or more processors, further cause operations comprising:
aggregating the record of instances where the user abstained into a reporting dataset;
generating a report indicating a progress of the user in the program of abstinence based on the reporting dataset for the user; and
generating a notification to the user for sharing the report.

7. The system of claim 1, wherein identifying the one or more programs of abstinence relevant to the user is based on the measure of elasticity of the recurring user activity, the current user activity, and user abstinence from the recurring user activity.

8. A method, comprising:
receiving a recurring user activity that is recurring at a previous location during a recurring time period, the previous location being a location where the recurring user activity was executed by a user;
in response to detecting that a current location of the user is in proximity of the previous location during an instance of the recurring time period, determining whether any user activity was executed by the user during the instance of the recurring time period while the user is present at the current location;
in response to determining that a current user activity was executed by the user and is different from the recurring user activity, processing the current user activity and the current location using a machine learning model to determine whether the current user activity is a substitute for an instance of the recurring user activity;
updating a measure of elasticity of the recurring user activity based on determining that the current user activity is a substitute for the instance of the recurring user activity;
based on the measure of elasticity of the recurring user activity, identifying one or more programs of abstinence relevant to the user; and
generating, for the user, a notification suggesting the one or more programs of abstinence.

9. The method of claim 8, further comprising:
processing, using another machine learning model, a history of user activities, to determine the recurring user activity.

10. The method of claim 9, further comprising:
in response to determining that no user activity was executed by the user, generating a notification to the user indicating no user activity was executed during the instance of the recurring time period.

11. The method of claim 8, wherein using the machine learning model to determine whether the current user activity is a substitute for an instance of the recurring user activity comprises:
using a clustering algorithm to identify activities with a score within a threshold of scores associated with the recurring user activity; and
determining whether the current user activity is included in the identified activities.

12. The method of claim 8, further comprising:
updating the machine learning model based on the measure of elasticity of the recurring user activity, the current user activity, and/or user abstinence from the recurring user activity.

13. The method of claim 8, further comprising:
receiving an indication of the user being enrolled in a program of abstinence from the recurring user activity;
generating a record of instances where the user abstained from the recurring user activity; and
generating real-time notifications to the user during the recurring time period regarding the program of abstinence.

14. The method of claim 13, further comprising:
aggregating the record of instances where the user abstained into a reporting dataset;
generating a report indicating a progress of the user in the program of abstinence based on the reporting dataset for the user; and
generating a notification to the user for sharing the report.

15. The method of claim 8, wherein identifying the one or more programs of abstinence relevant to the user is based on the measure of elasticity of the recurring user activity, the current user activity, and user abstinence from the recurring user activity.

16. A non-transitory computer-readable medium storing instructions that, when executed by one or more processors, cause the one or more processors to perform operations comprising:
receiving a recurring user activity that is recurring at a previous location during a recurring time period, the previous location being a location where the recurring user activity was executed by a user;
receiving an indication of the user being enrolled in a program of abstinence from the recurring user activity;
in response to detecting that a current location of the user is in proximity of the previous location during an instance of the recurring time period, determining whether any user activity was executed by the user during the instance of the recurring time period while the user is present at the current location;
generating a record of instances where the user abstained from the recurring user activity; and generating real-time notifications to the user during the recurring time period regarding the program of abstinence.

17. The non-transitory computer-readable medium of claim 16, wherein the instructions further cause the one or more processors to perform operations comprising:

processing, using another machine learning model, a history of user activities, to determine the recurring user activity.

18. The non-transitory computer-readable medium of claim 17, wherein the instructions further cause the one or more processors to perform operations comprising:

in response to determining that no user activity was executed by the user, generating a notification to the user indicating no user activity was executed during the instance of the recurring time period.

19. The non-transitory computer-readable medium of claim 17, wherein the instructions further cause the one or more processors to perform operations comprising:

based on a measure of elasticity of the recurring user activity, a current user activity, and/or user abstinence from the recurring user activity, identifying one or more programs of abstinence relevant to the user; and generating for the user a notification suggesting the one or more programs of abstinence.

20. The non-transitory computer-readable medium of claim 16, wherein the instructions further cause the one or more processors to perform operations comprising: aggregating the record of instances where the user abstained into a reporting dataset; generating a report indicating a progress of the user in the program of abstinence based on the reporting dataset for the user; and generating a notification to the user for sharing the report.

* * * * *